United States Patent [19]
Sosa

[11] 3,906,640
[45] Sept. 23, 1975

[54] DRILLING ALIGNMENT DEVICE FOR ELECTRIC HAND DRILLS

[76] Inventor: Hector M. Sosa, 7311 S.W. 132 Ave., Miami, Fla. 33183

[22] Filed: Aug. 19, 1974

[21] Appl. No.: 498,260

[52] U.S. Cl. .................................. 33/263; 33/286
[51] Int. Cl.² .......................................... G01C 15/00
[58] Field of Search ............ 33/263, 275, 286, 227

[56] References Cited
UNITED STATES PATENTS

| | | | |
|---|---|---|---|
| 2,407,845 | 9/1946 | Nemeyer | 33/286 |
| 2,822,615 | 2/1958 | Durst et al. | 33/286 |
| 2,855,679 | 10/1958 | Gibble | 33/286 |

*Primary Examiner*—Richard E. Aegerter
*Assistant Examiner*—Richard R. Stearns
*Attorney, Agent, or Firm*—Ernest H. Schmidt

[57] ABSTRACT

An optical alignment device for achieving perpendicularity in the drilling of openings in flat surface areas of a workpiece by the use of an electric hand drill is described. A pair of spaced circular sighting openings having a common axis parallel with the rotational axis of the drill serve as a line of sight for observing an image of the peripheries of the sighting openings as reflected by a reflecting surface coincident or parallel with respect to the planer surface of the workpiece being drilled. The sighting opening nearest the workpiece is larger than the one nearer the eye of the operator-observer, so that the reflection of the smaller opening can be observed through the reflection of the larger opening. The nearer to concentricity of the observed circular images as adjustably maintained during a drilling operation, the greater the degree of precision in perpendicular drilling being achieved. Auxilary reflecting devices applied to surface areas of the workpiece provide image reflecting surfaces parallel with the planar surface of the workpiece being drilled in instances where such planar surfaces are not inherently reflective.

10 Claims, 10 Drawing Figures

US Patent  Sept. 23,1975  Sheet 1 of 2  3,906,640
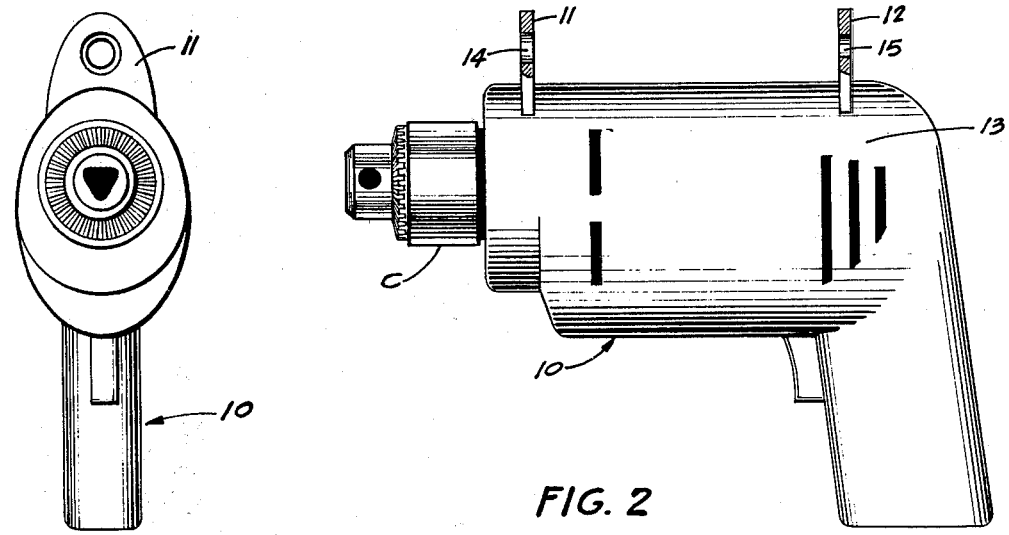
FIG. 1
FIG. 2
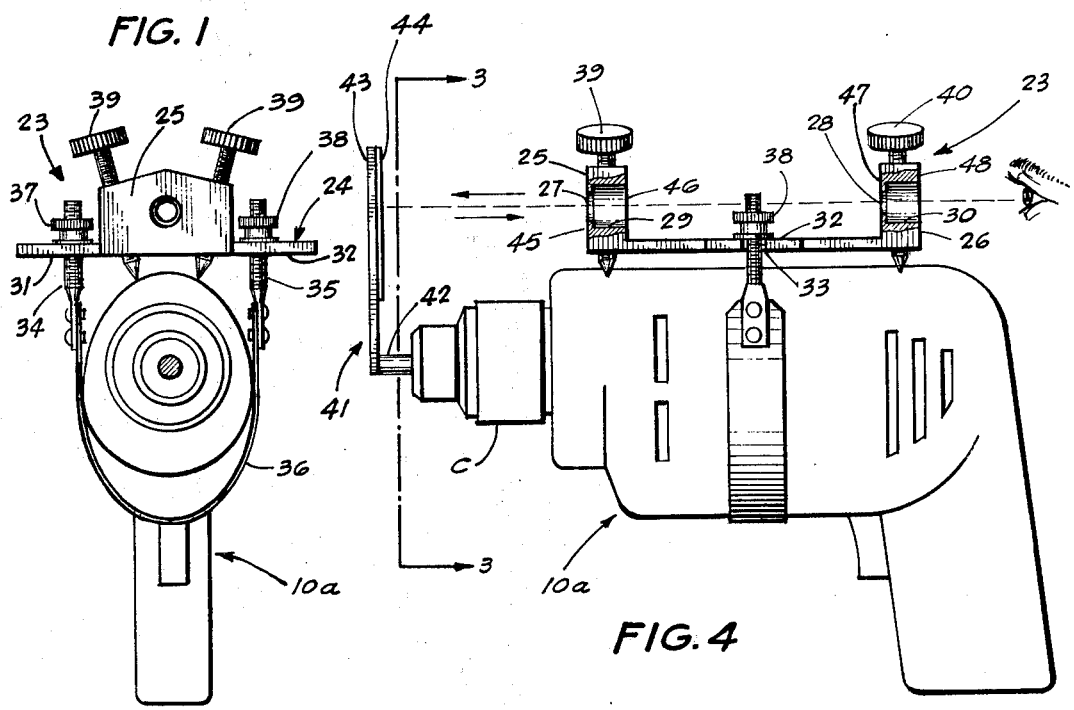
FIG. 3
FIG. 4
FIG. 5
FIG. 6

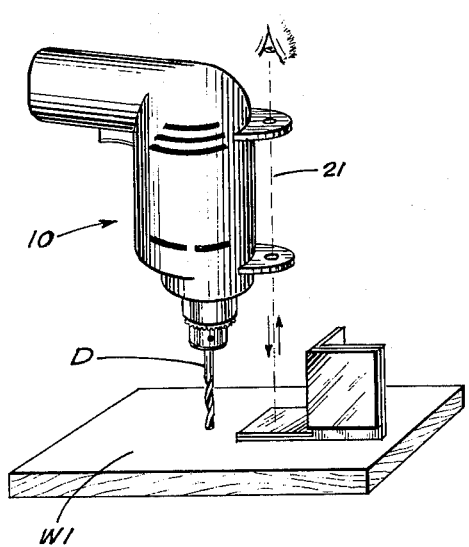
FIG. 7
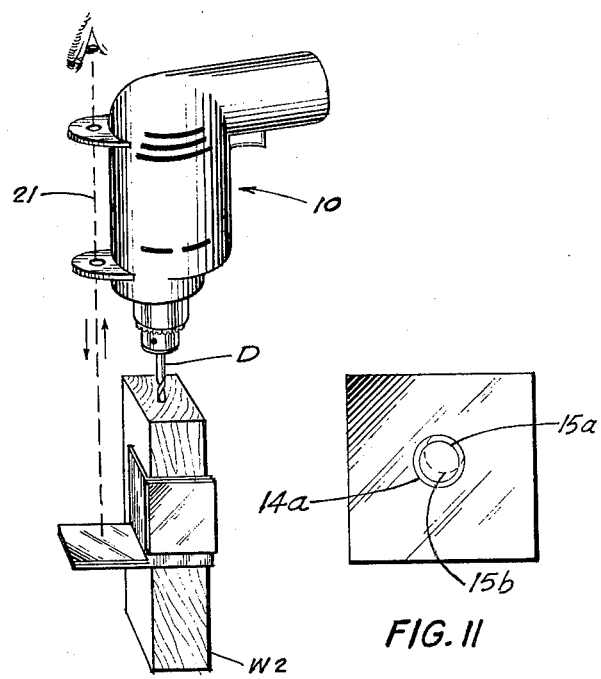
FIG. 8
FIG. 11
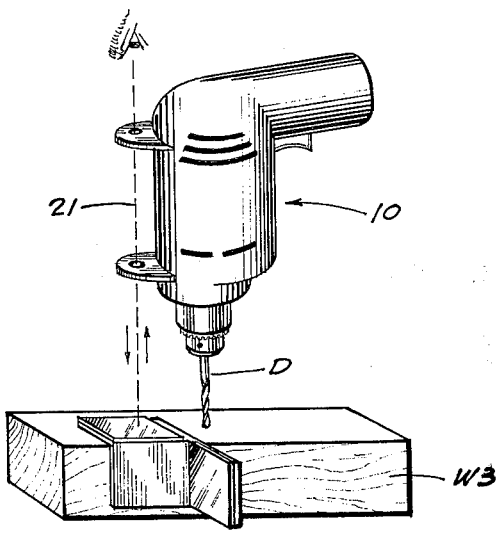
FIG. 9
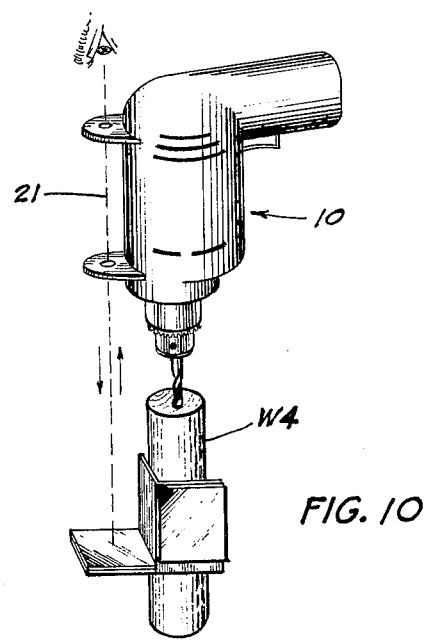
FIG. 10

DRILLING ALIGNMENT DEVICE FOR ELECTRIC HAND DRILLS

This invention relates to electrical hand drills, and is directed particularly to a device for use in association with such hand drills, which permits accurate positioning of the tool during its use in drilling perpendicular openings or bores in flat surfaces of a workpiece.

It is very difficult to drill a precisely vertical bore in a flat surface of a workpiece with the use of an ordinary electric hand drill. In many drilling operations, such as when drilling starter holes for wood screws or the like, great percision is not required, so that the approximation to vertical or perpendicular drilling that can be achieved simply by observing the position of the drill while drilling into the workpiece is satisfactory. However, when drilling for other purposes where greater accuracy is required, and particularly when drilling into metals for screw tapping and the like, direct observation of the relative position of the drill to the workpiece during the drilling process will not ordinarily produce satisfactory results. In order to overcome this difficulty, various aligning devices have heretofore been devised as an aid in achieving perpendicular drilling in flat surfaces of a workpiece. Such devices heretofore devised, however, have been deficient in various respects, principally in that they were mechanically complex and therefore difficult to maintain in operational adjustment, or they relied for their operation on mechanical contact with the workpiece, which more often than not interfered with the drilling operation.

It is, accordingly, the principal object of this invention to provide a novel and improved drilling alignment attachment device for hand drills and the like drilling or boring tools that obviates the deficiencies of drilling alignment devices heretofore devised.

A more particular object of the invention resides in the provision of a drilling alignment device for electric hand drills and the like that utilizes the sighting of a reflected image of a pair of spaced openings the common axis of which is parallel with the drill axis as observed through the spaced openings as an optical method of alignment, the image being reflected in a plane coincident or parallel with the drilling plane of the workpiece.

Another object of the invention is to provide a drilling alignment device of the character described wherein ambient light is utilized for image reflection and wherein the sighting openings are of circular configuration, the opening nearest the reflecting surface being of comparatively greater diameter to permit observation of the peripheries of both openings during alignment sighting, the nearness to concentricity of the reflected images being determinative of the precision of vertical alignment being achieved during a drilling operation.

Another object of the invention is to provide a drill alignment device of the above nature wherein the sighting openings can be provided either in appropriate standards or the like forming an integral part of the drill housing, or supplied in an attachment device that can be readily secured to the body or housing of an ordinary hand drill.

Still another object of the invention is to provide drill alignment device of the above nature including an auxilary reflecting device applicable to various surfaces, selectively, of a workpiece and operative to provide a reflected image for use in sighting in instances wherein the workpiece being drilled is non-reflective.

Other objects, features and advantages of the invention will be apparent from the following description, when read with reference to the accompanying drawings. In the drawings, wherein like reference numerals denote corresponding parts throughout the several views:

FIG. 1 is a front elevational view of a typical electric hand drill equipped with a drill alignment device embodying the invention;

FIG. 2 is a side elevational view thereof, with portions broken away to illustrate constructional details;

FIG. 3 illustrates, in front elevation, a drilling alignment attachment device embodying the invention for use with ordinary electric hand drills, as seen from the vertical plane indicated at 3—3 of FIG. 4;

FIG. 4 is a side elevational view of the attachment device and the associated electric drill to which it is attached, the attachment device being illustrated partly in vertical section to illustrate constructional details, and the hand drill having chucked therein an auxiliary reflector device facilitating parallel adjustment thereof with respect to the hand drill to effect proper positional adjustment of the alignment device;

FIG. 5 is an oblique view of a multi-purpose auxiliary reflecting device for use in association with the drilling alignment device when drilling into objects having no suitable reflection surface portions perpendicular to the axis of drilling;

FIG. 6 is an oblique view of the auxiliary reflection device of FIG. 4, shown separately;

FIG. 7 illustrates use of the aligning device equipped drill of FIGS. 1 and 2 in drilling a perpendicular hole into a flat surface with the use of the auxiliary reflection device of FIG. 5 as a reflection surface in a plane parallel with the drilling surface of the workpiece;

FIG. 8 illustrates use of the multipurpose auxiliary reflecting device of FIG. 5 in association with a piece of lumber such as a 2 × 4 to provide a reflecting surface parallel with the end of such a workpiece which is to be perpendicularly drilled;

FIG. 9 illustrates still another use of the multipurpose auxiliary reflecting device of FIG. 5 in providing a reflecting surface parallel with the plane into which a perpendicular bore is to be drilled in a comparatively narrow workpiece;

FIG. 10 illustrates still another use of the multipurpose reflecting auxiliary device of FIG. 5 in providing a reflecting surface perpendicular with respect to the longitudinal axis of a cylindrical workpiece; and FIG. 11 illustrates, schematically, a typical reflected image of the auxiliary reflecting device of FIG. 5 as seen through the sighting holes of the drill alignment device when sighting as illustrated schematically in FIGS. 7 through 10 during the manual adjustment process of the hand drill.

Referring now in detail to the drawings, reference numeral 10 designates, generally, a typical electric hand drill equipped with one form alignment drill alignement device comprising front and rear sighting standards 11, 12 extending upward of upper surface portions of the drill body and being substantially perpendicular with the rotational axis of the drill chuck.

The sighting standards 11, 12 will preferably be integrally formed with the drill body or casing 13 and are mutually spaced by substantially the length of said casing from front to back to permit precise positional alignment in the manner hereinafter described. As illustrated in FIGS. 1 and 2, the front sighting standard 11 is provided with a through opening 14 and the rear sighting standard 12 is provided with a through opening 15 of somewhat lesser diameter than the through opening 14. The through openings 14 and 15 are coaxial, their common axis being parallel with the rotational axis of the drill chuck C.

The multipurpose auxiliary device, designated generally by reference numeral 16 in FIG. 5, comprises a pair of mutually perpendicular, substantially square support plate portions 18, 19, and a support plate portion 20 perpendicular with plate portion 19 and extending outwardly of plate portion 18 in a plane perpendicular therewith. The individual support plates 18, 19 and 20 thus lie in mutually distinct perpendicular planes. As further illustrates in FIG. 5, the inner surface of the support plate portion 18 has cemented or otherwise secured thereto a flat mirror 18a, and the support plate portion 20, at the outside thereof, has affixed thereto a flat mirror 20a.

FIG. 7 illustrates how the alignment device equipped drill of FIGS. 1 and 2 is used in precisely drilling a perpendicular bore in a flat workpiece W1 with associative use of the multipurpose auxiliary reflecting device 16 of FIG. 5. As illustrated, the drill D is placed at the point on the surface of the workpiece where drilling is to take place, and the reflecting device 16 is placed upon the drilling surface of the workpiece so that its reflecting mirror 18a can be seen upon viewing through the aligned through openings 14, 15 as represented by the reflecting light ray indicated at 21 in FIG. 7. When properly aligned for vertical drilling the reflection of the relatively small diameter through opening 15 will appear to be concentric with the reflection of the through opening 14 of the sighting standard 11, as illustrated in FIG. 11, wherein the reflection of the smaller through opening, indicated at 15a, is seen as being concentric with the image 14a. Reference numeral 15b in FIG. 11 illustrates, in broken lines, a slightly misaligned position of the smaller through opening image which will be seen just before true alignment is achieved by concentric positioning of the through opening images. It will be noted that the diameter of the larger through opening 14 through which its reflection and the reflection of the relatively smaller diameter opening 15 are observed as reflected images, is only slightly greater than the diameter of the smaller opening, so that it is very easy to judge very precisely when the circle images are concentric and vertical alignment of the drill D with respect to the flat drilling surface of the workpiece W1 has been effected. Drilling will be commenced while continuing to observe the reflected image to maintain vertical disposition to the drill D until drilling has been completed. It will be understood that since, as described above, the common sighting axis of the through openings 14 and 15 is paralled with the rotational axis of the drill D, the greater the precision with which vertical alignment can be achieved and maintained by sighting through the alignment openings 14, 15 for concentricity, the greater will be the precision with which a perpendicular bore will be drilled in the workpiece.

FIG. 8 illustrates how the drilling alignment device 16, embodying the invention can be used for drilling a perpendicular bore in the end surface of an elongated workpiece W2 such as a piece of 2 × 4 lumber. In this instance, to provide an image-reflecting surface parallel with the plane in which the perpendicular bore is to be drilled, the auxiliary reflecting device 16 will be placed against the side of the workpiece W2 so that the included right-angular surfaces of the support plates portions 19, 20 will abut face-to-face against adjoining side face portions of the workpiece. With such positioning, the support plate portion 18 and its associated reflecting mirror 18a will extend perpendicularly outwardly of the workpiece W2 in a convenient position for sighting through the aligning through openings 14, 15 to achieve proper positioning of the drill D while drilling as described above with respect to the drilling operation of FIG. 7.

FIG. 9 illustrates another possible use of the auxiliary reflecting device 16 in setting up for perpendicular drilling into a side wall of a relatively small length of an elongated workpiece W3 of rectangular cross-sectional shape. As illustrated, the inside surfaces of the support plate portions 19, 20 are fitted in face-to-face relation against the respective top and side portion of the workpiece W3 so that the support plate portion 18 thereof extends outwardly of one side of the workpiece. Such use of the auxiliary reflector device 16 will be found to be preferable so that illustrated and described with reference to FIG. 7 above in close-quarter situations where there is either no space for upstanding portions of the reflecting device, or such upstanding portion would interfere with or otherwise make the drilling operation difficult. Here again the, technique utilized in achieving and maintaining perpendicular positioning of the drill D with respect to the workpiece surface being drilled by sighting for concentricity of reflected images is the same as described above in connection with the description of the use of the device as illustrated in FIGS. 7 and 11 above.

FIG. 10 illustrates how the multipurpose auxiliary alignment device 16 can be utilized as a reflecting surface for drilling along an axis coincident with or parallel with respect to the longitudinal axis of an elongated cylindrical or rod-like workpiece W4. In this instance, the peripheral surface or outer wall of the cylindrical workpiece will be fitted in abutting relationship within and against the interior surfaces of the support plate portions 19 and 20, whereupon the support plate portion perpendicular with respect to the longitudinal axis of the workpiece W4. As described above, alignment can be achieved and retained during the drilling operation for drilling the workpiece along an axis coincident with or parallel with respect to the longitudinal axis of the workpiece.

FIGS. 3 and 4 illustrate a drilling alignment attachment device 23 for use in association with an ordinary electric hand drill 10a. The drilling alignment attachment device 23 comprises a flat base portion 24 having upstanding front and rear sighting standards 25, 26 having coaxially aligned front and rear through openings 27, 28 respectively, each of which is counterbored from back to front, as illustrated at 29 and 30, respectively. Means is provided for adjustably attaching the drilling alignment device to the body or casing of an ordinary electric hand drill 10a so that the common axis of the sighting through openings 27, 28 will be parallel with the rotational axis of the chuck C of the drill. To this end, the alignment attachment device base portion 24 is formed, at each side, with central, opposed wing portions 31, 32 having through openings 33 (only one illustrated in FIG. 4) through which the screw studs 34, 35 joined to the outer ends of a metal strap 36 is used as a sling under the body of the electric drill to which the device is attached, being secured in place by thumb nuts 37, 38. As means for positionally adjusting and securing the drilling alignment attachment device in place, pairs of front adjustment thumb screws 39, 39 and rear adjustment screws 40 (only one illustrated in FIG. 4) are screw-threaded in opposed, complementary through openings in the front and rear sighting standards 25, 26, respectively. As illustrated in FIG. 3, the adjustment thumb screws 39, 39 and 40 are symmetrically disposed at somewhat convergent angles. The outer ends of the thumb screws 39, 39 and 40 are sharpened for point contact with the upper surface of the body of the electric drill to which the device is attached.

Auxiliary reflector means is provided to facilitate proper parallel adjustment of the attachment device 23. To this end, as illustrated in FIGS. 4 and 6 an auxiliary reflector device 41 is provided, said reflector device comprising a short rod 42 from one end of which extends a support plate 43 carrying a mirror 44 the plane of which is perpendicular to the longitudinal axis of said rod. In use, as illustrated in FIG. 4 the rod 42 will be securely chucked in the chuck C of the electric drill 10a to which the drilling alignment attachment device is to be secured in adjusted position, after which the mirror can be sighted through the openings 27, 28 and adjustment made by manipulation of the thumbscrews 39, 39 and 40, and thumb nuts 37, 38 to achieve parallelism with the rotary axis of the chuck C as hereinabove described. Once such parallelism has been achieved, the auxiliary reflecting device 41 will be removed and the drill operated for perpendicular drilling or boring in the manner and with the means described above in connection with the description of operation of the embodiment of the invention illustrated in FIGS. 1, 2 and 7 through 11 of the drawings.

In order that the visual presentation of perpendicular drilling be as distinctive as possible, the front and back surfaces 45, 46 and 48 of the front and rear sighting standards 25 and 26 will be finished in flat black, whereas the front surface 47 of the rear sighting standard 26 will be finished flat white. With such surface treatment, the observed border or annular ring surrounding the rear opening will appear in white against the contrasting larger front opening, surrounding portions which will be seen in black. Thus small deviations from perpendicular positioning while drilling can easily be observed without eyestrain, and correction can readily be undertaken while drilling is in progress. In this connection it will be understood that, in the embodiment of the invention illustrated in FIGS. 1 and 2 above, the front and rear surfaces of the front sighting standard 11 will also preferably be finished in flat black, and the front surface of the rear sighting standard 12 will be finished in flat white to similarly facilitate sighting.

While I have illustrated and described herein only two forms in which my invention can conveniently be embodied in practice, it is to be understood that these forms are presented by way of example only and not in a limiting sense. The invention, in brief, comprises all the embodiments and modifications coming within the scope and spirit of the following claims.

What I claim as new and desire to secure by Letters Patent is:

1. A drilling alignment device for electric hand drills including an electric drive motor, a housing surrounding the motor, and a drill chuck extending outwardly of the housing and driven by the electric motor for rotatively supporting a drilling tool, the combination comprising, means defining a pair of spaced, circular sighting openings attached to the motor housing, the common axis of origin of said circular openings defining a line-of-sight substantially parallel with the rotational axis of the drill chuck, the diameter of said opening nearest the outer end of a drilling tool supported by the chuck being somewhat greater than the diameter of the other opening, so that upon sighting through the smaller of said openings, reflected images of peripheral marginal portions of each of said openings will be observable.

2. A drilling alignment device as defined in claim 1, wherein said sighting openings defining means comprises front and rear standard members extending outwarding of the drill housing, the larger diameter opening of said pair of openings being in said front standard member and the smaller opening being in said rear standard member.

3. A drilling alignment device as defined in claim 2, wherein the forward surface of said front standard member is finished in a dark color and wherein the forward surface of said rear standard member is finished in a light color to provide contrasting image portions thereof upon their reflected images being observed through the common axis line-of-sight of said openings.

4. A drilling alignment device as defined in claim 1 comprising a base member, spaced, parallel upstanding front and rear sighting standards at each end of said base member, said front and rear sighting standards defining, respectively, said greater and smaller openings, and means for removably attaching said base member to the housing.

5. A drilling attachment device as defined in claim 4 wherein said housing attachment means comprises means for adjustably securing said base member in place with respect to said housing member so that the line-of-sight through said circular openings will be substantially parallel with the rotational axis of the drill chuck.

6. A drilling detachment device as defined in claim 5 wherein said means for adjustably securing said base member in place comprises a flexible metal strap slung about the motor housing, means for securing the ends of said strap with respect to opposite side portions of said base member, and means for tiltably adjusting said base member with respect to said housing about a pair of perpendicular axes, one of which is parallel to the axis of said drill.

7. A drilling attachment device as defined in claim 6 wherein said means for further adjusting the securement position of said base member comprises a first pair of pointed thumb screws extending through a first pair of laterally-spaced threaded openings in one end of said base member and a second pair of pointed thumb screws extending through a second pair of laterally-spaced threaded openings in the other end of said base member.

8. A drilling attachment device as defined in claim 7 wherein the forward surface of said upstanding front sighting standard is finished in a dark color, and wherein the forward surface of said rear sighting standard is finished in a light color to provide contrasting image portions thereof upon their refected images being observed through the common axis line-of-sight of said openings.

9. A drilling attachment device as defined in claim 4 wherein the forward surface of said upstanding front sighting standard is finished in a dark color, and wherein the forward surface of said rear sighting standard is finished in a light color to provide contrasting image portions thereof upon their reflected images being observed through the common axis line-of-sight of said openings.

10. A drilling alignment device as defined in claim 1 and further including an angular auxiliary reflecting member providing flat reflecting surfaces in three distinct and mutually perpendicular planes.

* * * * *